US008923931B2

(12) United States Patent
Rathus et al.

(10) Patent No.: US 8,923,931 B2
(45) Date of Patent: Dec. 30, 2014

(54) WIRELESS COMMUNICATION DEVICE MANAGEMENT

(75) Inventors: Spencer A. Rathus, Surfside, FL (US); John W. Olivo, Jr., La Jolla, CA (US)

(73) Assignee: Marshall Feature Recognition LLC, Marshall, TX (US)

( * ) Notice: Subject to any disclaimer, the term of this patent is extended or adjusted under 35 U.S.C. 154(b) by 313 days.

(21) Appl. No.: 13/481,133

(22) Filed: May 25, 2012

(65) Prior Publication Data

US 2012/0231779 A1 Sep. 13, 2012

Related U.S. Application Data

(63) Continuation-in-part of application No. 12/795,306, filed on Jun. 7, 2010, now Pat. No. 8,249,665, which is a continuation of application No. 11/156,237, filed on Jun. 17, 2005, now Pat. No. 7,734,315.

(51) Int. Cl.
*H04M 1/00* (2006.01)
*H04B 1/08* (2006.01)
*H04W 48/02* (2009.01)
*H04W 8/00* (2009.01)

(52) U.S. Cl.
CPC .............. *H04B 1/082* (2013.01); *H04W 48/02* (2013.01); *H04W 8/005* (2013.01)
USPC ...... 455/569.2; 455/410; 455/411; 455/456.4

(58) Field of Classification Search
CPC ....................................................... H04W 4/04
USPC .......................... 455/569.2, 410–411, 456.4
See application file for complete search history.

(56) References Cited

U.S. PATENT DOCUMENTS

| | | |
|---|---|---|
| 4,723,265 A | 2/1988 | Kamei et al. |
| 6,222,458 B1 | 4/2001 | Harris |
| 6,690,940 B1 | 2/2004 | Brown et al. |
| 6,782,266 B2 | 8/2004 | Baer et al. |
| 6,799,052 B2 | 9/2004 | Agness et al. |
| 6,973,333 B1 | 12/2005 | O'Neil |
| 7,734,315 B2 | 6/2010 | Rathus |
| 7,899,471 B2 | 3/2011 | Aaron |
| 8,249,665 B2 * | 8/2012 | Rathus et al. ............... 455/569.2 |
| 2005/0170850 A1 | 8/2005 | Edwards et al. |
| 2007/0186275 A1 | 8/2007 | Shahbazi |
| 2011/0136469 A1 | 6/2011 | Rathus |

OTHER PUBLICATIONS

Steve Krawczyk & Corinne Michaud, Biometrics in the Banking Industry, Michigan State University Computer Science and Engineering CSE 891, Spring 2005. http://www.cse.msu.edu/~cse891/Sect601/CaseStudy/BiometricsBankingIndustry.pdf.

(Continued)

*Primary Examiner* — Amancio Gonzalez
(74) *Attorney, Agent, or Firm* — Ward & Zinna, LLC

(57) ABSTRACT

A method and system that limits the use of a communication device present in an area controlled by an intelligent controller. The intelligent controller detects any present communication devices in the area and conducts an inventory providing information about each detected device. The intelligent controller compares that information to a standard of use data, which specifies the conditions need to be present for allowing the usage of a communication device. If such conditions are not met, the intelligent controller sends commands to the communication device to restrict its functionality. Else if, the intelligent controller is incapable of restricting the communication device, it can notify authorities of unauthorized usage of a communication device in the restricted area.

16 Claims, 19 Drawing Sheets

(56) References Cited

OTHER PUBLICATIONS

Beauru of Consumer Protection Business Center, Financial Institutions and Customer Information: Complying with the Safeguard Rule, Website, Apr. 2006, http://business.ftc.gov/documents/bus54-financial-institutions-and-customer-information-complying-safeguards-rule.

Thomas F. Dapp, Growing Need for Security in Online Banking: Biometrics Enjoy Remarkable Degree of Acceptance, Website, Feb. 8, 2012, http://www.dbresearch.de/PROD/DBR_INTERNET_EN-PROD/PROD0000000000284825.pdf.

Symantec, Introduction to SSL, Webiste, https://www.symantec.com/theme.jsp?themeid=how-ssl-works&inid=vrsn_symc_ssl_How_It_Works.

Time Greene, Top 10 Web Hacking Techniques of 2010 Revealed, Website, Jan. 24, 2011, http://www.networkworld.com/news/2011/012411-top-web-hacking-techniques.html.

John Adams, Wi-Fi—A Hot Spot for Crime, Mar. 1, 2012, http://www.americanbanker.com/btn/25_3/Wi-Fi-A-Hot-Spot-for-Crime-1047011-1.html?zkPrintable=true.

\* cited by examiner

WIRELESS COMMUNICATION DEVICE MANAGEMENT

CROSS-REFERENCE TO RELATED APPLICATIONS

This application is a continuation-in-part of U.S. patent application Ser. No. 12/795,306, filed Jun. 7, 2010, which is a continuation of U.S. patent application Ser. No. 11/156,237, filed Jun. 17, 2005, now U.S. Pat. No. 7,734,315.

FIELD OF THE INVENTION

The present invention relates to the area of wireless communication and, in particular, to third party management of wireless devices.

BACKGROUND OF THE INVENTION

The use of wireless devices has increased dramatically within the last decade. Individuals and business entities are in constant communication via wireless networks through devices such as cellular telephones, PDA's, hybrid cellular telephones, tablet computers, and computers. The ability to easily communicate with others has caused many individuals to develop habits of using these devices at various locations. However, some uses of wireless communication devices are disturbing to the public, interfere with various sensitive electronics and provide additional venues for fraudulent behavior. In the most extreme cases, this interference can be life threatening.

To restrict this interference, many different mechanisms have been proposed. For instance, after various studies, many U.S. jurisdictions have prohibited cell phone usage while operating a vehicle because the studies indicated that operating a cell phone is a distraction to the driver. The driver's attention becomes focused on operating the device and talking into it rather than the traffic and other driving conditions in her surroundings.

Many technological advances have led to developments to correct these problems. Some of these advances are voice recognition units, speakerphone components, hands-free devices, Bluetooth-enabled devices, and earpieces. However, such devises do not monitor nor prevent the use of cellular telephones.

Concurrently, theaters, restaurants, churches and schools began to regulate the use of cellular telephones since cellular communications can be a nuisance. One approach to solve this problem was the creation of cell phone silencers. Such devices communicate with cellular phones within the area and turn down their ringers. However, this system still does not prevent the use of a cellular phone. Rather, it prohibits a cell phone from ringing.

In hospitals and airplanes the use of wireless communication devices interferes with various sensitive electronics, such as electronic monitoring equipment. Cellular phone detection products were developed to detect the presence of cellular phones and send an alarm to the user. However, such systems do not strictly prohibit the use of a cellular phone since a user need not cooperate. Intel has developed a system for use in an airplane. The system uses Bluetooth technology to detect and determine the type of electronic devices present and subsequently notifies the crew. Further, the system can send a "shutdown command" to the electronic device which automatically turns the device off. While useful, the system unnecessarily disables the electronic devices from use.

Wireless communication devices, including cellular phones and laptops, can access confidential financial documents stored in financial institutions computing systems through wireless networks, servers and monetary dispensing machines. Financial institutions use an array of fraud prevention techniques including private networks, secure socket layer encrypted connections, strong passwords, and video surveillance. However, these techniques quickly become obsolete as the technology for fraudulent behavior continues to evolve. Wireless communication device users may exploit weak spots, inherent in any computing system, to obtain bank account numbers or customer information. Exploitation, or hacking, can be accomplished through any communication device capable of wireless internet connection. Additionally, MP3 function found on many wireless communication devices can be used to sonically record account information found on magnetic stripping of credit cards and debit cards while in use at monetary dispensing machines. There are currently no entirely secure methods of protecting financial information. Inhibiting the use of wireless communication devices in financial institutions and near monetary dispensing machines would prevent fraudulent behavior before it can be attempted.

Methods for interrupting transmitted and received signals from communication devices are well known. Most of these devices simply distort, revert, block, or otherwise manipulate the signal. One device currently being used in Europe is called a "Jammer," which simply blocks signals centered on frequencies used by the communication device. When in use, the communication device appears to have no signal. However, all frequencies within a predetermined area up to 30 feet are blocked. No emergency numbers can be dialed or received, which creates an unsafe situation. In addition, Jammers are currently illegal in the United States.

In order to overcome the problem of non-selective blocking, an "Interceptor" is often used. Instead of completely blocking the signal in a specified area, incoming calls are diverted to a user's voicemail while outgoing calls are blocked. An exception can be made for emergency numbers. However, these emergency numbers need to be pre-programmed within a specific area of use. In addition, the Interceptor has to communicate with a proximate cellular tower to maintain functionality.

Consequently, methods and systems have been developed to incorporate jamming technology into vehicles and/or communication devices. One method electrically connects a jamming device to the transmission of a car in order to render the communication device "on" while the vehicle is in "Park," or "off" when the vehicle is in a gear permitting movement. Further development in this field, incorporates additional circuitry and components into the vehicle and communication device which allows for more versatility and functionality of the communication device. These methods and systems selectively control the functions of the communication device. However, these functions are determined by pre-determined, specified parameters. For instance, these conditions might include times when the car is moving at or above a certain speed; when the car is not in "Park"; when pressure is sensed on the drivers' seat; and/or when the conditions monitored within the car are suitable for driving.

In order to determine the existence of one of the aforementioned conditions, many electronic devices are used. Infrared devices, wireless components, and many other types of sensors are used to determine the functionality of a communication device. For example, the sensor or sensors can detect signals to and/or from the communication device and either (i) disable it when a first condition is present, or (ii) turn it off when a second condition is present. However, this system is expensive to implement because it requires circuitry in the phone, in the vehicle, and in any other area for use. In addition, this type of system does not allow passengers within the vehicle or other individuals within a given area to use their cellular devices. Consequently, the entire vehicle becomes a "dead" zone.

Therefore, there is a clear need for a method and system in which the operation of a communication device is selectively controlled, yet maintains efficiency, effectiveness, and simplicity.

SUMMARY OF THE INVENTION

The current invention has capabilities that improve both the field and the prior art. The system can improve current transit conditions and enforce current laws and regulations. On the other hand, the invention allows for an individual's continual use of his or her communication device, in compliance with standards of safety and law. The invention is capable of activation and deactivation dependent on many factors that might include the jurisdiction of its location, emergency situations, use of a peripheral device, and the like.

One object of the present invention is to restrict the usage of communication devices in a restricted area.

Another object of the present invention is to disable transmitting functioning of the communication device while permitting the usage of other functioning.

Another object of the present invention is to restrict the usage of a communication device in a vehicle.

Another object of the present invention is the use of a cellular tower to communicate with the intelligent controller present in the vehicle restricting the usage of a communication device.

Another object of the present invention is to allow the passengers of the vehicle the usage of communication devices while the driver is restricted.

Another object of the present invention is to allow the drive the usage of a communication device while the vehicle is in park.

Another object of the present invention is to allow the drive of the vehicle the usage of a communication device while the communication device is connected to a hands free peripheral.

Another object of the present invention is to lock the key functions of a communication device and use voice recognition technology while in a vehicle.

Another object of the present invention is to issue citations to the communication device operator upon non compliance.

Another object of the present invention is to discourage tampering, disablement, or removal of the intelligent controller used to restrict the usage of a communication device.

Another object of the present invention is to restrict the usage of a communication device in an airplane.

Another object of the present invention is to provide and charge for a local network access in an airplane to restrict the usage of a communication device with an outside network.

Another object of the present invention is to use a display screen to display detected communication devices present in the restricted area.

Another object of the present invention is to restrict the usage of a communication device in a building or an event environment.

Another object of the present invention is to restrict the usage of a communication device in a financial institution or property belonging to a financial institution.

Another object of the present invention is to restrict the usage of a communication device in the peripheral area surrounding a monetary dispensing machine.

The present invention comprises a system for communication device management within a vehicle. Means are provided for detecting communication devices in an area within the vehicle. Means are provided for recognizing the communication devices. And an intelligent controller provides a standard of use data and means for controlling the functions of the communication devices, wherein the detection means and the recognition means are associated with the intelligent controller.

The communication device can be, but is not limited to, a cellular telephone, personal computer, PDA, pocket computer, and hybrid device. The controlling means can disable a transmitter, power, processor, and/or memory associated with the communication devices. Alternatively, it can disrupt incoming signals and/or transmitting signals associated with the communication devices. Preferably, the area within the vehicle comprises an area associated with an operator of the vehicle, while the communication device is associated with the operator of the vehicle.

The intelligent controller can be located within a door, console, steering wheel, ceiling, and/or floor of said vehicle. The intelligent controller can communicate with an outside source such as but not limited to a cellular tower, a radio transmitters, Wi-Fi, Bluetooth, and toll tag readers. Additionally, the intelligent controller can comprise a positioning unit capable of determining the location of the vehicle and communicate the determined location to authorities using the outside source. Further, the intelligent controller can notify authorities if tampered with using the outside source. The intelligent controller can comprise vehicle information and communicate the vehicle information to the outside source. The intelligent controller can provide a warning (e.g. an audio signal, an alarm, and a visual signal) to an operator of the vehicle when the controlling means is unable to control the communication device and issue a citation to a registered user of the communication device or to a registered operator of the vehicle after a predetermined number of warnings. The intelligent controller can be connected to a transmission of the vehicle, wherein the standard of use data can prohibit the use communication devices when the transmission is in drive.

The standard of use data can be stored in the intelligent controller or can be fed from an outside source. The standard of use data can restrict only the use of cellular devices within an area of the vehicle. Standard of use data can allow the use of the cellular devices when a specified number is entered into said cellular device such as an emergency telephone number or when the cellular device is connected to a peripheral device. The specified number can be communicated to the cellular device via the intelligent controller wherein the specified number is pre-programmed or is communicated to the intelligent controller via an outside source.

The present invention further comprises a system for communication device management within monitored area such as an airplane, building, hospital, movie theater, restaurant, church, school, conference center, casino, government building, event, government event, financial institution, property belonging to a financial institution, and the peripheral area surrounding a monetary dispensing machine. Means are provided for detecting communication devices in the monitored area. Means are provided for recognizing the communication devices. And an intelligent controller is provided comprising a standard of use data and means for controlling the functions of the communication devices, wherein the detection means and the recognition means are associated with the intelligent controller.

Multiple detecting means can be located within the monitored area. A communication device can be, but is not limited to, a cellular telephone, personal computer, PDA, pocket computer, tablet computer and a hybrid device. The controlling means can disable a transmitter, power, processor, and/or memory associated with the communication device or can disrupt incoming signals or transmitting signals associated with said at least one communication device. Standard of use data is stored in the intelligent controller.

The intelligent controller can further comprise a positioning unit capable of determining the location of the communication device in the monitored area. The intelligent controller can communicate a warning signal (e.g. an audio signal, an alarm, and a visual signal) to the communication device when the controlling means is unable to control the functions of the communication device, and further issue a citation to the user of the communication device after a predetermined number of warnings. Additionally, the intelligent controller can comprise a display unit which provides information (e.g. recognized type, operating status, and number of detected communication devices) to personnel that monitor the area. The intelligent controller can further comprise a local network, connect a selected communication device to the local network, and charge the user of the communication device for using the local network.

A method is also provided for communication device management within monitored area such as an airplane, building, hospital, movie theater, restaurant, church, school, conference center, casino, government building, event, and government event. The method includes the steps of detecting communication devices in the monitored area, recognizing the communication devices, providing information about the communication devices, comparing the information to a standard of use data, and controlling the functions of the communication devices, wherein the standard of use data determines the controlling the functions of the communication devices.

The method can further comprise the steps of displaying the information to personnel that monitor the area, communicating a warning signal to a communication device when the controlling the functions of the communication device is ineffective, and issuing a citation to a user of the communication device after a predetermined number of warnings.

Additionally, the functions the communication device comprises the steps of disabling a transmitter, power, processor, and/or memory associated with the communication device, or disrupting incoming signals or transmitting signals associated with said at least one communication device. Controlling the functions of the communication device may also comprise obtaining authorization from the communication device or user for the communication device to connect to a local network. Authorization may be in the form of biometric data from a user, data within an encrypted certificate, or any other means known or understood to be used in the art of secure wireless transmission. Further, controlling the functions of the communication device comprises connecting a selected communication device to a local network and charging for using said local network.

BRIEF DESCRIPTION OF THE DRAWINGS

A further understanding of the present invention can be obtained by reference to preferred embodiments as set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the specific methods and instrumentalities disclosed.

DETAILED DESCRIPTION OF THE INVENTION

The following detailed description is intended to merely provide a further understanding of the present invention. This description is merely provided to clarify the present invention, however, it will be recognized by one skilled in the art that the description of the present invention provided herein are not intended to limit the scope of the invention. Consequently, well known methods, procedures, and substances for carrying out the objectives of the present invention are incorporated herein but have not been described in detail as not to unnecessarily obscure aspects of the present invention.

Figure 1A:
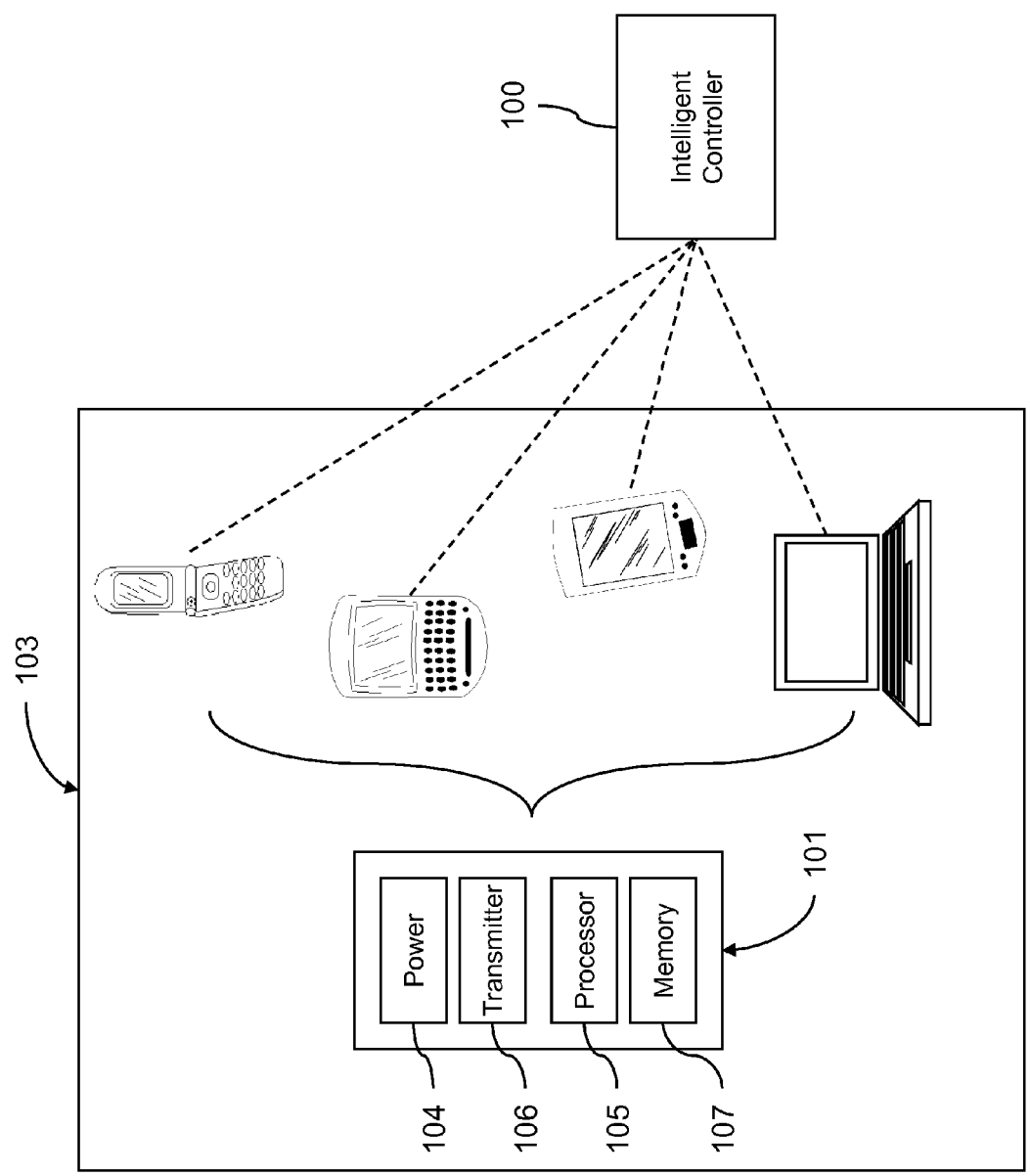
FIG. 1A: Depicts an illustration of the interaction of the major components of communication devices and the intelligent controller, in accordance with the present invention.

The present invention comprises an intelligent controller (hereinafter "IC") device 100 capable of communicating and controlling wireless communication devices (hereinafter "WCD") 101 located within area 103 as seen in FIG. 1A. The IC device 100 can be implemented in various forms and can contain various features and elements, including a memory means, a processor, an IR sensor, RF frequency converter, modulator/demodulator, frequency synthesizer, multiplier, transceiver, or the like. The IC device 100 provides a signal that controls the functionality of the WCD 101 such as controlling the states of power source 104, processor 105, transmitter 106, memory 107, or combination thereof. The WCD 101 can employ a plurality of forms, including but not limited to a cellular telephone, a PDA, a hybrid device, a pocket computer, a personal computer, or the like.

Figure 1B:
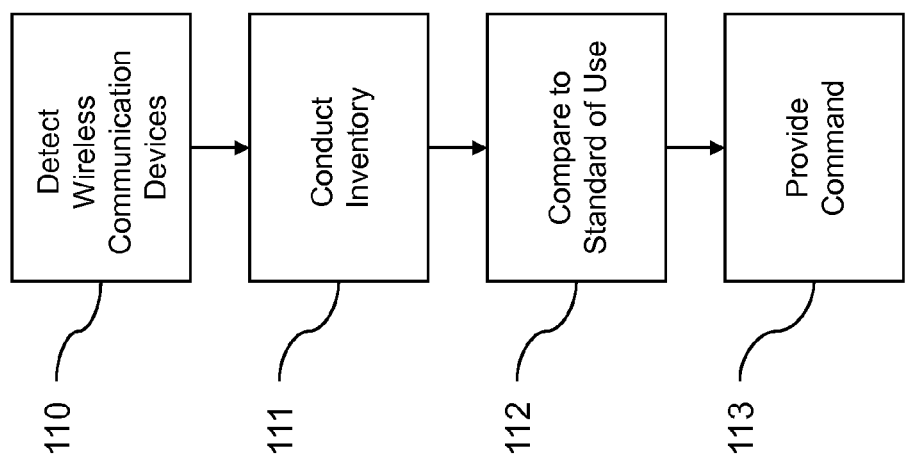
FIG. 1B: Depicts a flow diagram of process steps executed by the intelligent controller of FIG. 1A, in accordance with the present invention.

In use, the IC device 100 detects all the WCD's 101 present in area 103, as seen in process 110 of FIG. 1B. The IC device 100 can employ a radio sensor to detect signals emitted from the WCD's 101. The detection range is controlled by proximity sensors which measure signal strengths and compare them to a set value of the weakest signal strength for a particular area. All the measured signal strengths that fall within such set value will be acknowledged by the IC device 100, while measured signal strengths that fall below such set value will be disregarded by the IC device 100. The IC device 100 will then conduct an inventory in process 111 of all the detected WCD's 101. The inventory process includes recording and temporarily storing all possibly known information about the detected WCD's 101. The information may include but not limited to the type, the location, the identity, and the state of WCD's 101. The type of the WCD 101 helps to determine how the WCD 101 can be controlled since it can provide the category (e.g. whether the WCD 101 is a cellular telephone, a PDA, a hybrid device, a pocket computer, or a personal computer), the make, and the model of the WCD 101. GPS or local positioning system may indicate to the IC device 100 the location of the WCD's 101 in area 103. The identity of WCD 101 may provide identification numbers associated with the WCD 101. As well, the IC device 100 can access information about the user of the WCD 101 by checking network registration information. For example, if the WCD 101 is a cellular phone, the network registration information can access the account of the subscriber. The state of the WCD 101 can indicate present time functioning of WCD 101 or its components 104-107, such as indicating whether the WCD 101 or components 104-107 are off or on.

Next the IC device 100 compare the found inventory information to the standard of use, in process 112. Standard of use data can be preloaded into the IC device 100 or fed into the IC device 100 from an outside source. The standard of use data can include various command codes and associated circumstances that needed to be met for determining the functionality of the WCD 101. The circumstances and the associated commands vary with system implementation are later discussed in detail. When such circumstances are met, the IC device 100 can issue the associated commands in process 113. Typically, the IC device 100 will issue an electronic command to turn on or off the transmitter 106 associated with WCD 101. However, the commands could differ according to the information found during the inventory and the standard of use.

Figure 2A:
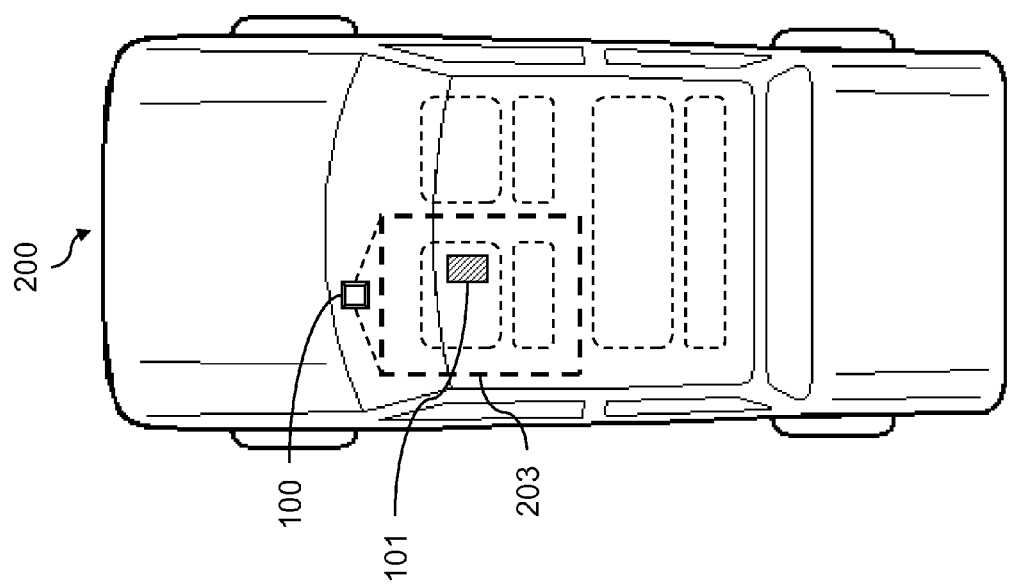
FIG. 2A: Depicts the integration of the intelligent controller in a vehicle, in accordance with the present invention.
Figure 2B:
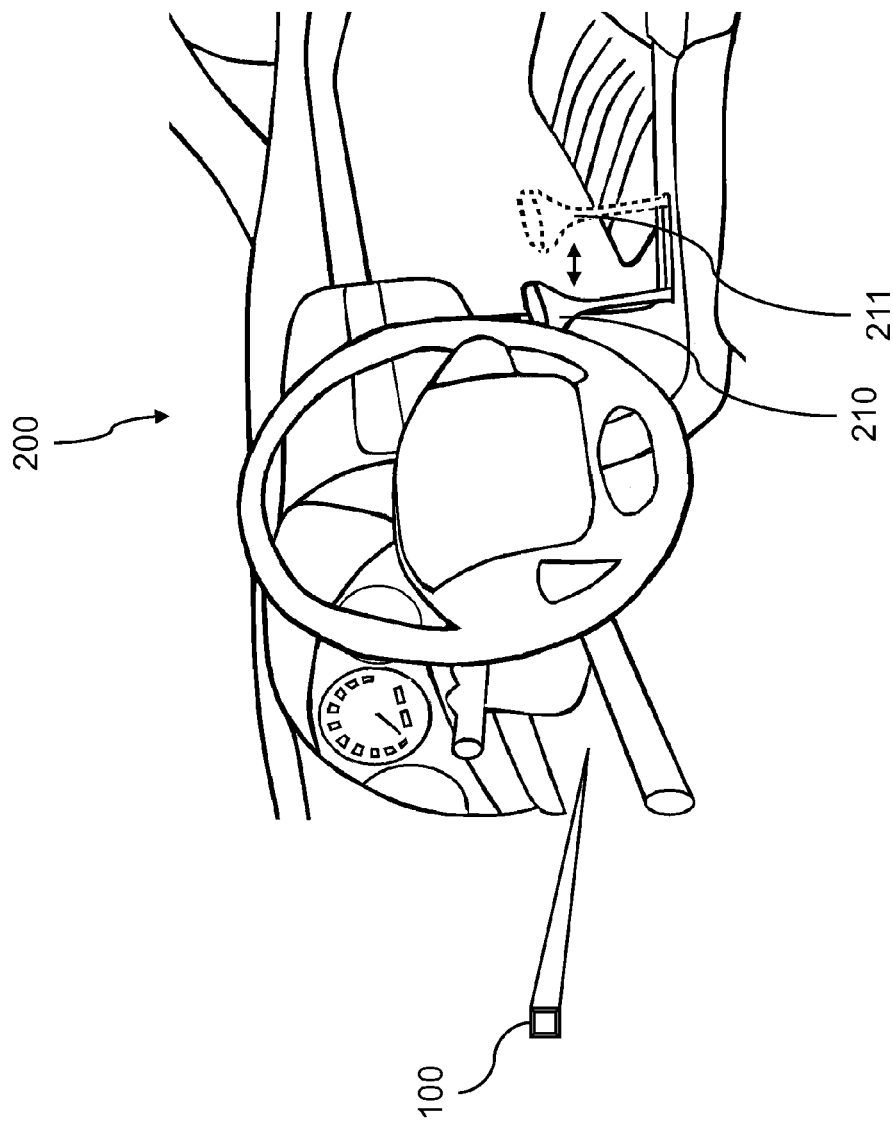
FIG. 2B: Depicts an internal view of a vehicle with the intelligent controller activated and deactivated with the transmission, in accordance with the present invention.
Figure 2C:
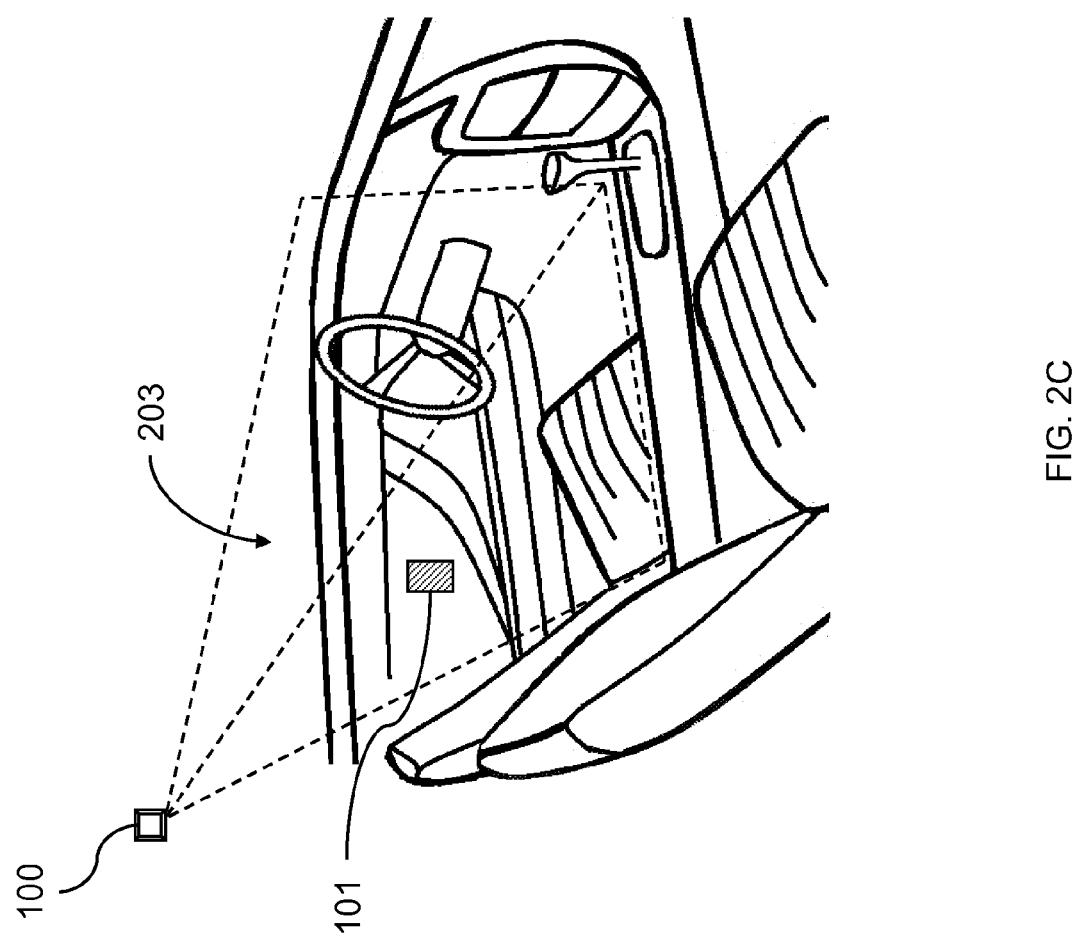
FIG. 2C: Depicts an internal view of a vehicle illustrating a pre-determined area where the usage of a communication device is restricted, in accordance with the present invention.

FIGS. 2A-2C illustrate IC device 100 installed in vehicle 200 for limiting the functionality of a WCD 101 in the vehicle 200 when that vehicle is switched on and its transmission permits forward or reverse movement. The IC device 100 either can be factory-installed or retrofitted to a vehicle 200 by a dealer or authorized agency. In a preferred embodiment, the IC device 101 is located near the operator of the vehicle 200, such as in a door, dashboard, or console on the drivers' side. The IC device 100 could be connected by wire and/or wireless means both to the ignition and to the transmission of vehicle 200. These connections allow activation of the IC device 100 when the vehicle 200 is both running and 'in gear.' The IC device 100 is not activated when the transmission is in 'Park' position 210, or, in the case of a manual transmission vehicle, the emergency or handbrake must be in use. When the vehicle 200 is removed from 'Park' position 210 to 'Drive' position 211, or the emergency brake is released, the IC device 100 turns on. FIG. 2C illustrates IC device 100 installed above the driver. The IC device 100 can control WCD 101 located only within a pre-determined area 203, such as an area large enough to cover the area of the operator of the vehicle 200, but so as not to limit or interfere with any other area in the vehicle. Therefore, passengers maintain functionality of their WCD's, even when the drivers' WCD 101 is deactivated.

Figure 3A:
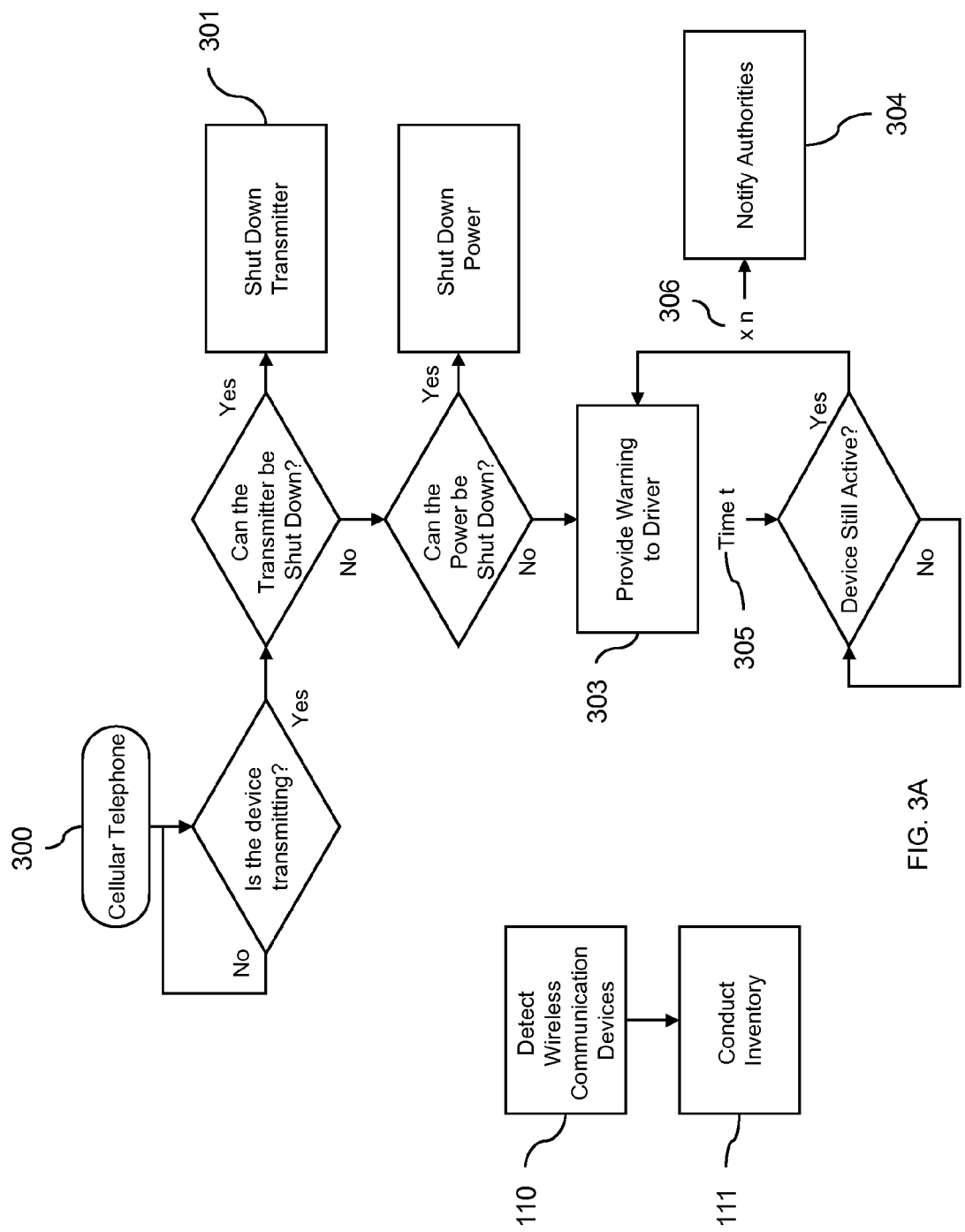
FIG. 3A: Depicts a flow diagram of process steps an intelligent controlled performs to restrict the usage of a communication device in a vehicle, in accordance with the present invention.

In the vehicle implementation, the preloaded standard of use data can depend on the laws and the rules where the vehicle is registered. For example, the standard of use is meant to prevent the use of cellular telephones in area 203. As the CI device 100 is activated, it continuously or in predetermined intervals scans the area 203 to detect WCD's in process 110 of FIG. 3A. As soon as at least one WCD 101 is found within area 203, the IC device 100 conducts an inventory in process 111. If the detected WCD 101 is a GPS navigation system, which is not restricted by the standard of use data, the IC device 100 disregards it. However if the WCD 101 is a cellular phone 300, the IC device 100 checks if the WCD 101 is in use, that is, whether the WCD 101 is transmitting. When the transmitter found to be active, the IC device 101 attempts to shut it down. Shutting down the transmitter in process 301 will prevent the driver in area 203 to use the WCD 101. The transmitter can be shutdown in various ways including issuing a command disconnecting the power supplied to the transmitter. Alternatively, the IC device 100 can issue a command triggering a process, or program in the WCD 101 which locks the transmitting functions of the transmitter with a signal. When such signal is removed, or the WCD 101 is removed from area 203, the functions of the transmitter are restores. If the IC device 100 is unable to shut down the transmitter, the IC device 100 checks if the power to the WCD can be shutdown. If the inventory information indicates that the IC device 100 is unable to control the functions of the detected WCD 101, the IC device can generate a warning to the driver signaling an unauthorized use of WCD 101, in process 303. The warning signal can be in various forms, such as, but not limited to, voice command, alarm, flashing light, or the like.

After a predetermined amount of time t 305, the IC device 100 can check if the WCD 101 is still active and regenerate the warning signal 303 upon non-compliance by the driver. After predetermined number of issued commands n 306, the IC device may notify authorities, in process 304. Alternatively, the IC device 100 may issue a command to the WCD 101 to send a message to the service provider indicating unauthorized WCD 101 use. The service provider can issue a citation and charge its customer a penalty fee on the monthly bill.

Additional circumstance might be present before determining whether the cellular phone 300 should be shut off. For example, the standard of use may allow use of WCD 101 while it is connected to a hands free peripheral. IC device 100 may continuously or in predetermined amount of time check whether the WCD 101 is connected to a hands-free peripheral in process 310. The driver is able to use his WCD 101 if a hands-free peripheral device, such as a Bluetooth headset 400, dock 401, or earpiece 402 is connected to the WCD 101. In a Bluetooth headset 400 configuration, the IC device 100 can have a sensor capable of detecting Bluetooth signals streaming between the WCD 101 and the headset 400. The docking station 401 might be built into the vehicle 200 by the vehicle manufacturer or manufactured by an outside source and retrofitted. The built in docking station 401 can be electronically connected to the IC device 100 directly notifying as an electronic connection with WCD 101 is detected. A remote docking station 401, which works similarly to earpiece 402, is detected by the WCD 101 as an electronic connection is made. The WCD 101 can transmit the presents of a hands-free peripheral to the IC device 100. The physical connection made between the communication device and the hands-free peripheral device indicates to the IC device 100 that a hands-free peripheral is used, enabling the driver's WCD 101 normal operation.

In order to further ensure the safety of the inhabitants of the vehicle 200 and other vehicles nearby, the IC device 100 can issue a command to disable the WCD's keypad when a peripheral device is connected. This disablement is compensated by a voice recognition system. The system can be associated with the WCD 101, peripheral 400-402, or the vehicle 200. Instead of dialing, sending, ending, or performing another function that requires locating and depressing a button on the WCD 101, the driver utilizes a voice recognition unit to verbalize these functions. Voice recognition technology allows drivers to keep their hands on the steering wheel and eyes on the road, and simultaneously perform functions on their WCD 101. An output/input speaker component also is incorporated into the WCD 101 to enable the driver constant verbal interaction.

Another factor of standard of use can permit continuous access to emergency numbers, whether preset or received. When a WCD 101 keys in an emergency number it is detected by the IC device 100 and the call is permitted with no interference. The emergency numbers are pre-programmed into the IC device 100 to recognize the numbers when dialed. The emergency numbers can include fire station number, police station, 911, or the like.

Removal or disablement of IC device 100 can result in a number of responses, including the automatic notification of authorities. Only an authorized individual or agency can remove it, service it, or modify it. Various approaches can be used to discourage tampering, disablement, or removal of the IC device 100. If tampered with, the IC device 100 triggers an alarm. The alarm is any one or combination of an audible sound, a flashing light, a dashboard light, or a notification to authorities. Additionally, the presence of the IC device 100 might close circuits that enable the vehicle to start and/or enable the transmission to be moved from 'Park' into another gear. Therefore, removal or destruction of the IC device 100 can prevent the vehicle from operating. In another embodiment, the IC device 100 closes circuits that send a signal to notify the authorities, the vehicle dealership, or another authorized agency. The IC device 100 or the vehicle can be connected with a global positioning system (GPS) component or device that provides authorities or other designated recipients with a continuous locating signal if the IC device 100 is removed or tampered.

Figure 5:
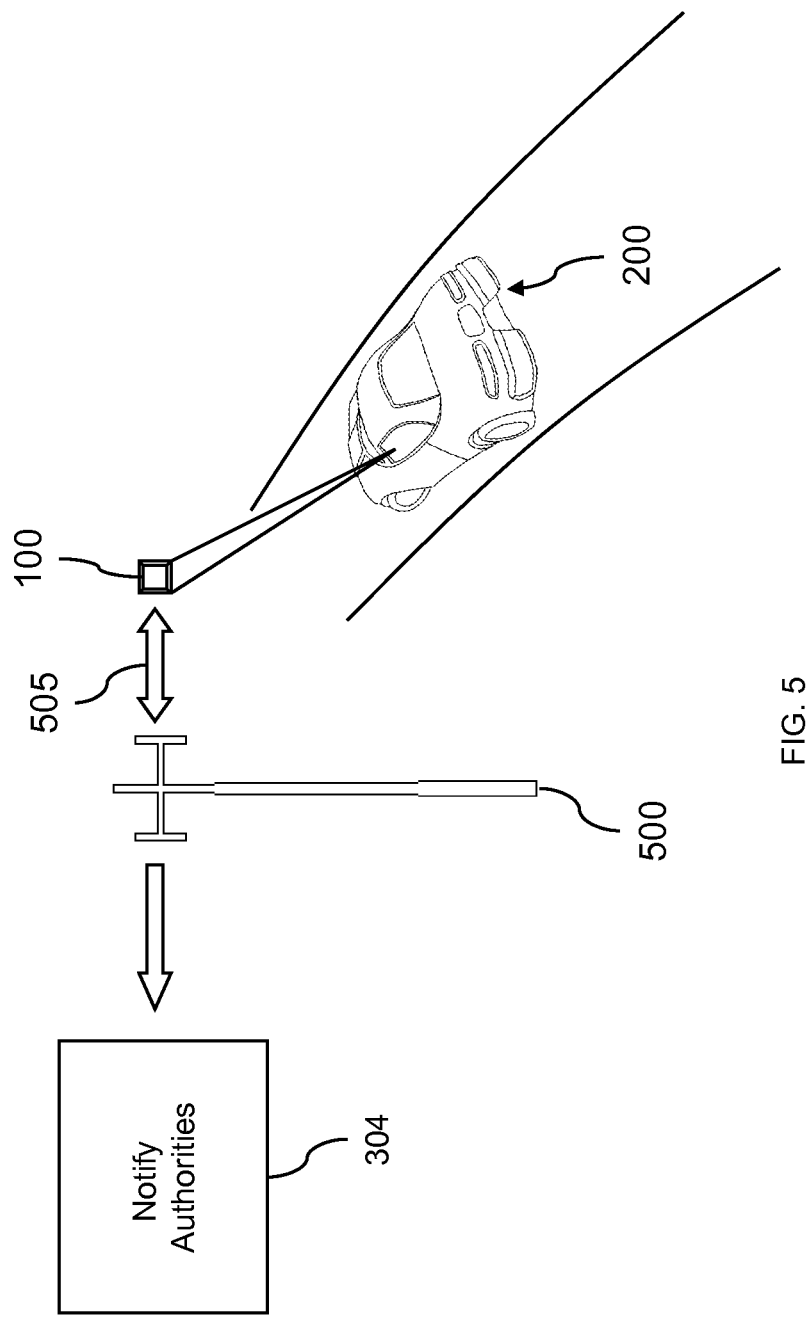
FIG. 5: Depicts the communication of the intelligent controller with a cellular tower, in accordance with the present invention.

FIG. 5 illustrates the use of a cellular tower 500 to communicate with the IC device 100. Other outside transmitting source can be used such as, but not limited to, radio transmitters, Wi-Fi, Bluetooth, and toll tag readers. To implement this, the IC device 100 has a transmitting device capable of receiving and emitting signals. Once the IC device 100 is activated within a vehicle 200, it can receive a transmitted signal 505 from the tower 500. The tower signal 500 provides informative signals that can control the functionality of the WCD. For instance, the signal 500 might provide local emergency numbers that are accessible upon dialing a preset emergency code or the like. The tower 500 can also transmit to the IC device 100 the local WCD standard of use. Dependent on the jurisdiction of the tower 500, the signal provided might disable the IC device 100 if cellular telephone usage is permitted while driving.

Figure 3B:
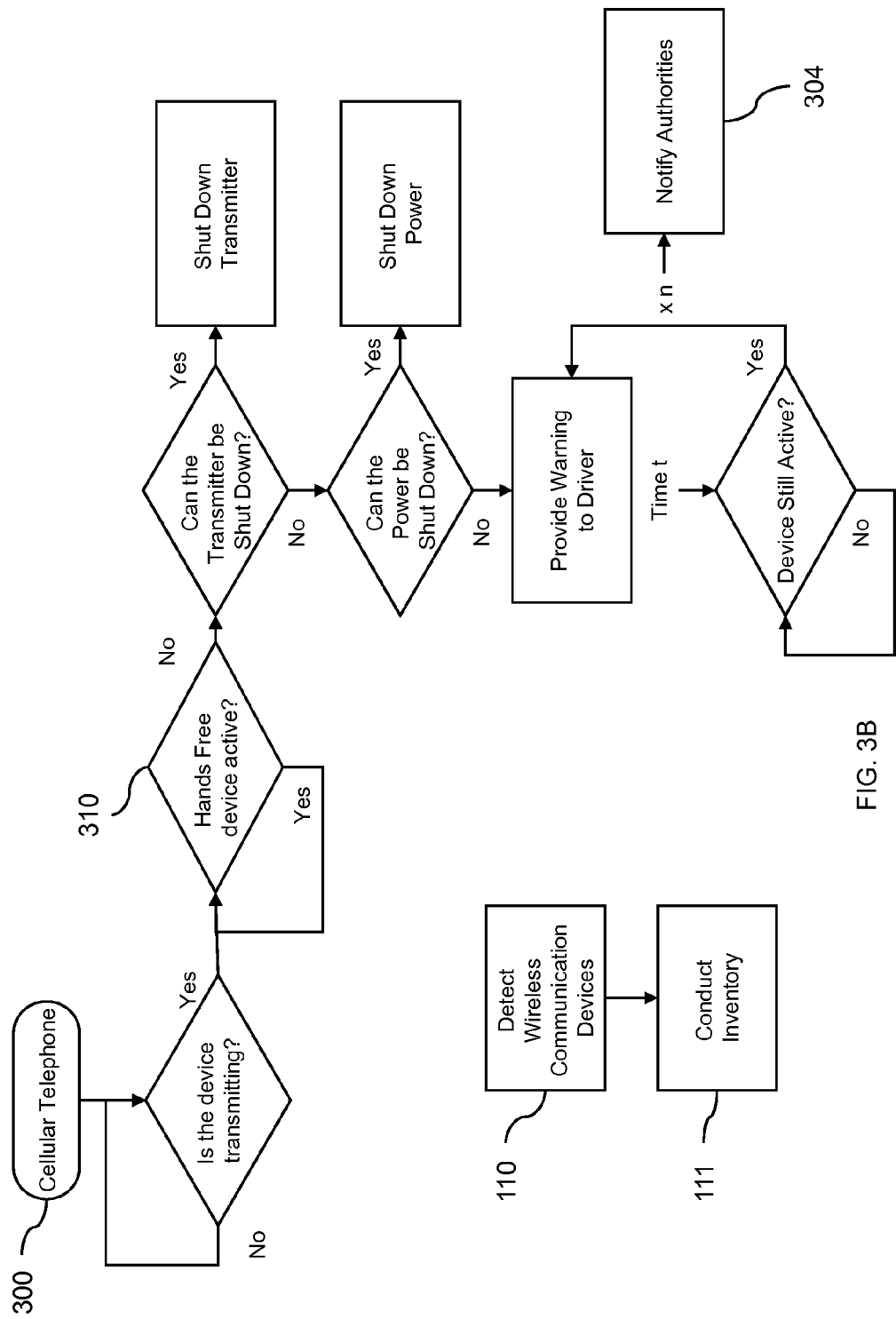
FIG. 3B: Depicts a flow diagram of FIG. 3A with addition of a hands free device allowing the usage of a communication device in a vehicle, in accordance with the present invention.
Figure 4:
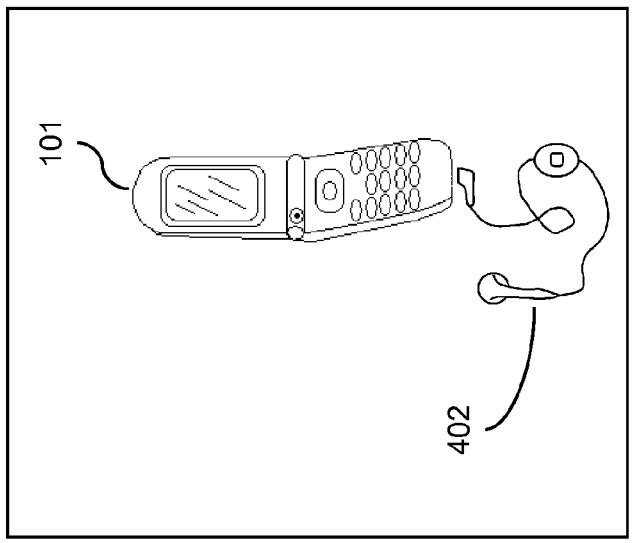
FIG. 4: Depicts various hands free devices allowing the usage of a communication device in a vehicle, in accordance with the present invention.
Figure 4:
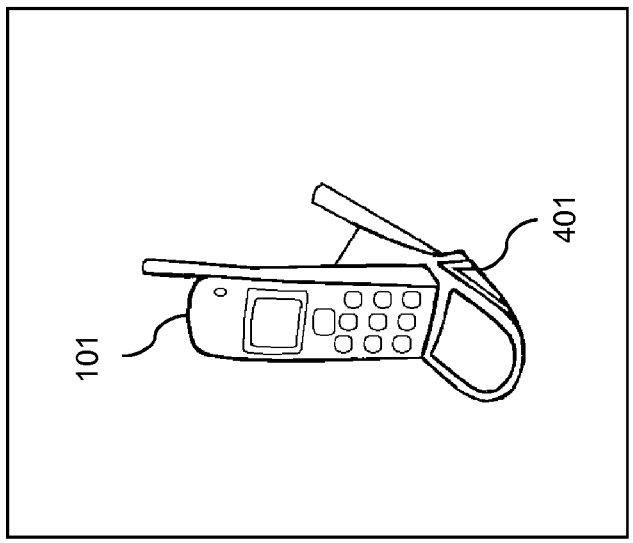
Figure 4:
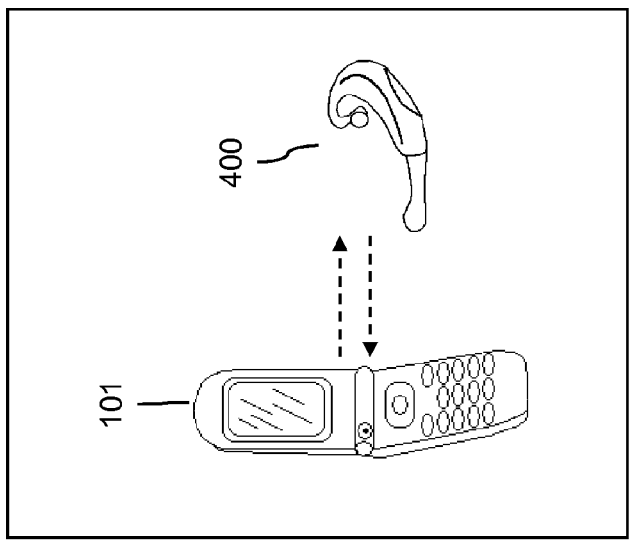

Another use of the tower signal 505 and IC device 100 communication is to notify authorities on unauthorized WCD usage, as described previously in process 304 of FIGS. 3A-3B. The IC device 100 can transmit signal containing information about the vehicle and operator. A vehicle identification number can be preloaded to the IC device 100 at the manufacturer. Alternatively, WCD operator information can be obtained from the WCD. In the least, the signals received by authorities through the tower 505 can identify the vehicle and the WCD ownership. The tower 500 can further communicate and notify authorities 304. These authorities might use the aforementioned techniques of GPS or cellular tower triangulation, in conjunction with WCD's. This is desirable if the vehicle is stolen, the IC device is disabled or removed, or if the user of the WCD needs to be located. To implement this through cellular towers, plurality of towers continuously or intermittently can triangulate and locate the WCD, and transmit information about location and movement of the vehicle to authorities.

Citations can be issued to either the person registered to the detected vehicle, or to the registrant of the detected WCD located within the vehicle upon unauthorized usage of the WCD or for removing or disabling the IC device 101. The citation might include a traffic violation, or the like. Instead the citation can be in a bill form, which can be sent to the registrant of the vehicle and/or to the registrant of the WCD. As such, the bill is sent to the residential address of the registrant, billed in conjunction with the WCD, automatically deducted from an account registered with a payee, or by a similar means. Briefly, if a toll tag reader is used to communicate with the IC device, the citation can appear on the monthly toll bill of the registrant.

Figure 6:
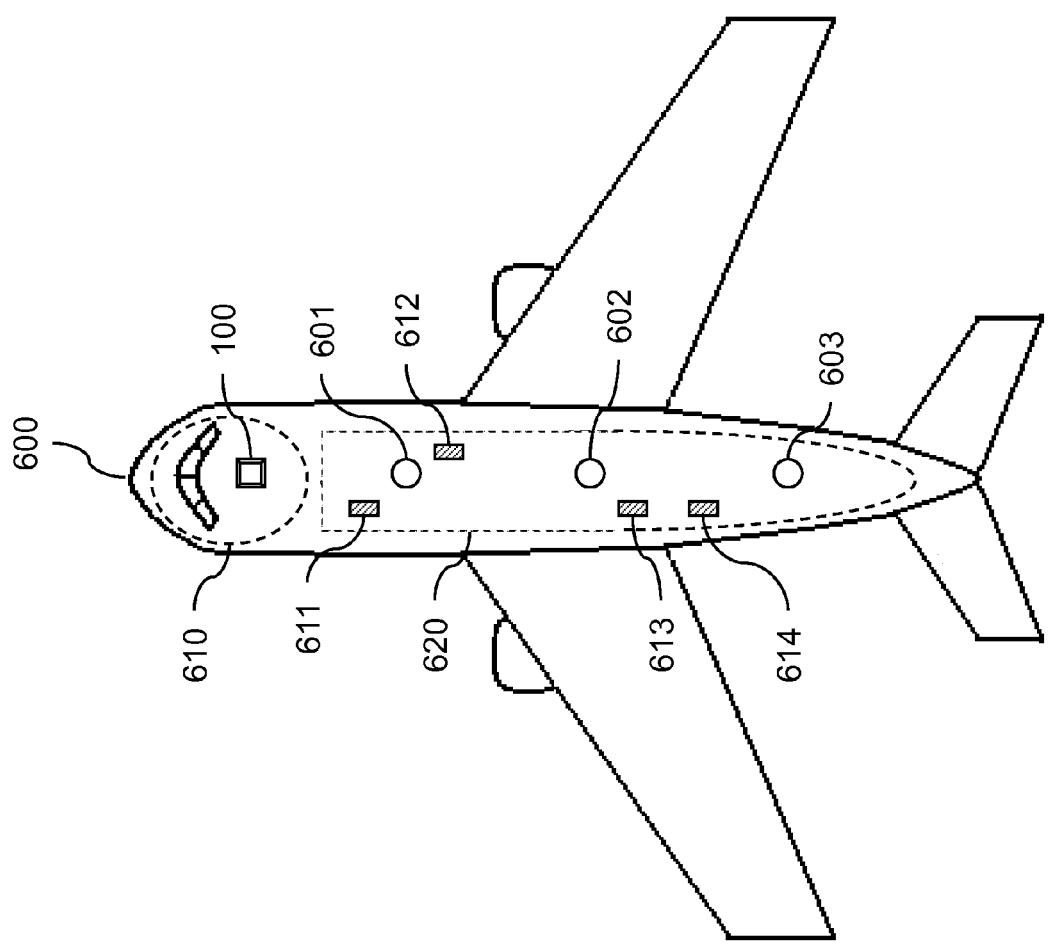
FIG. 6: Depicts the integration of the intelligent controller in an airplane, in accordance with the present invention.
Figure 7A:
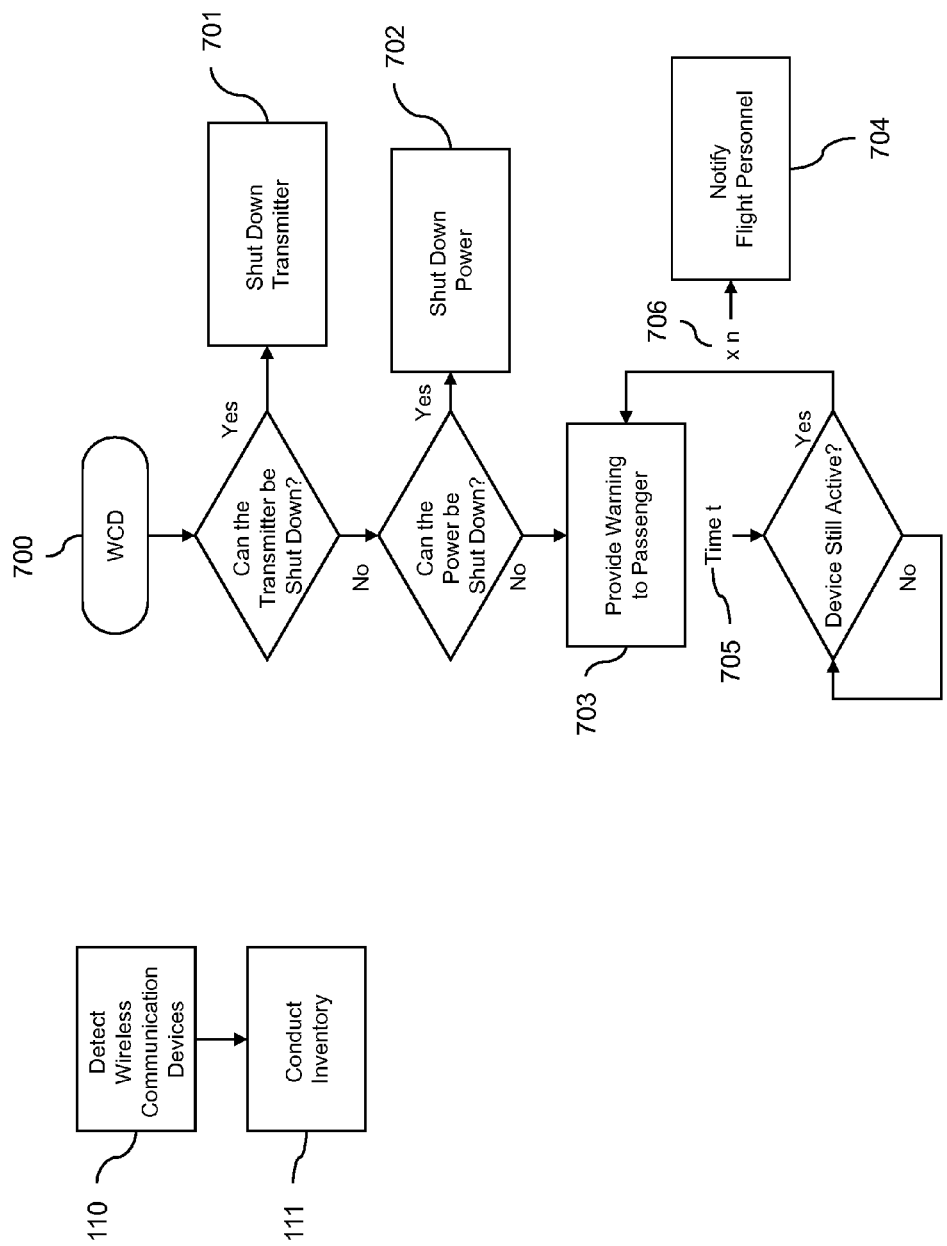
FIG. 7A: Depicts a flow diagram of process steps an intelligent controlled performs to restrict the usage of a communication device in an airplane, in accordance with the present invention.

To control communication in a large area, such as an airplane of FIG. 6, a more powerful sensor or a series of sensors 601-603 are used to detect WCD's 611-614. The sensors communicate and are being controlled by a central IC device 100. The sensors might be located in the ceiling, the floor, or any other part of the airplane 600. The IC device 100 can be located in the cockpit 610 and have controls which are implemented at the discretion of the pilots. Upon flight initiation the IC device 100 is turned on and begins to scan the passenger areas 620 for any present WCD, as in process 110 of FIG. 7A. The IC device 100 then conducts inventory, in process 111. And compare the inventory to standard of use 112.

In an airplane implementation the standard of use might permit the use of WCD's during certain periods of the flight, such as preflight and post-flight stage. At that time the IC device 100 does not interfere with the detected WCD's 611-614. During the flight period it is desired to have no transmitting capabilities. The IC device first checks whether the WCD's transmitters be shut down, and provides a command to the sensors 601-603 to shut down the transmitters of cooperating WCD's, in process 701 of FIG. 7A. This permits the airplane passenger to continue to use the WCD without the transmitting functions. Otherwise, the IC device 100 determines whether the WCD's power can be turned off and accordingly sends a command in process 702. A warning could be issued to the passenger in a case of a non-cooperating WCD. The warning 703 could be sent directly to the WCD, for example, a cellular telephone may receive a text message from the IC device 100. Or else, a signal device could be incorporated to the passenger sitting are capable of providing a warning in a visual or audio form. After predetermined amount of time 705, the IC 100 can check whether the non-cooperating WCD is still active and provide additional warnings. If the device remains active after pre-selected number of checks 706, the IC device can notify flight personnel 704.

Figure 7B:
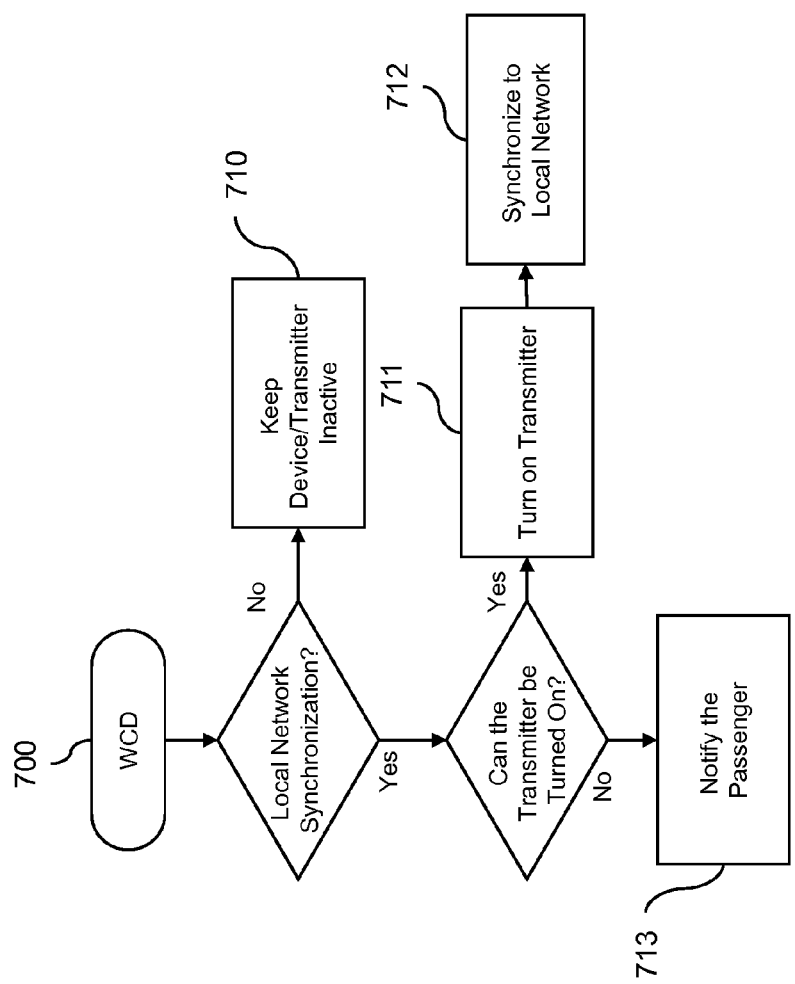
FIG. 7B: Depicts a flow diagram which allows the usage of a communication device on a local network, in accordance with the present invention.
Figure 8:
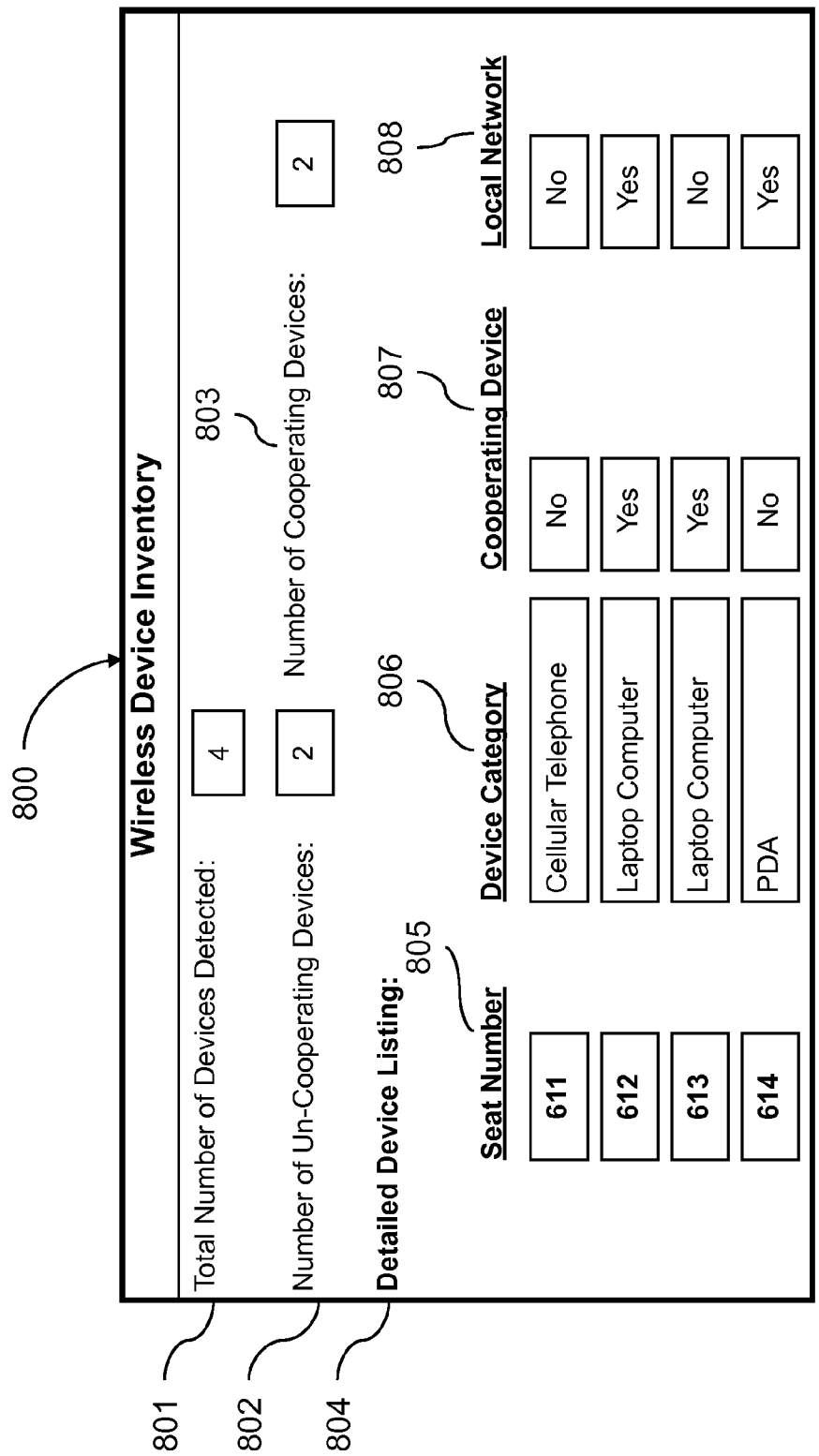
FIG. 8: Depicts a display screen displaying information provided by the intelligent controller, in accordance with the present invention.
Figure 9:
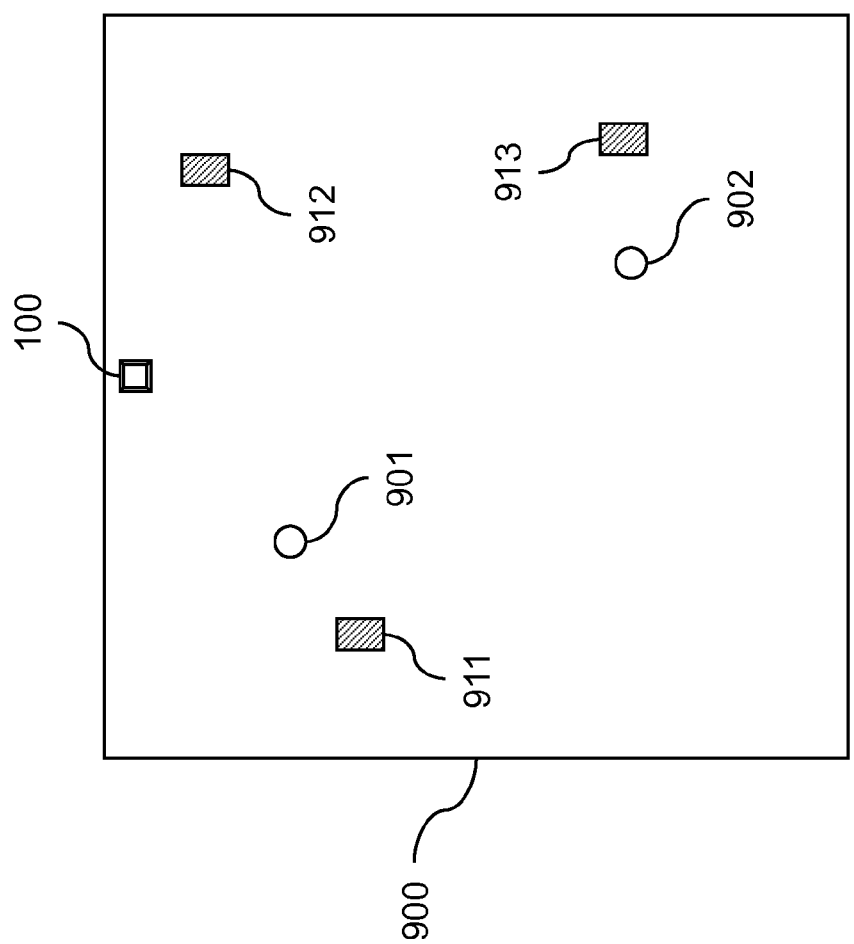
FIG. 9: Depicts the integration of the intelligent controller in a building or an event environment, in accordance with the present invention.

The airplane 600 can offer local network communication access during a particular period of the flight. First, the IC device 100 can determine whether the detected WCD's are compatible and can be synchronized with the local network in FIG. 7B. Non compatible WCD's will remain in the turned off stage in process 710. The IC device 100 will check whether it can turn the transmitters on for the found compatible WCD's, sends a command to sensors 601-603 to turn on the transmitter 711, and synchronize the WCD to the local network 712. Otherwise, a passenger can be notified that he can return the WCD back on and connect to the available local network 713. The passenger can be charged for the local network access, provided with a bill at the end of the flight or prepay local network usage.

A display screen 800 can be connected to the IC device 100 that provides inventory results to the flight personnel, such as a listing of the WCD's 611-614 detected within the passenger area 620 as illustrated in FIG. 7. The total number of devices detected 801 provides the total count of WCD's present in area 620. The total number may vary with time, as passenger turn on and off their WCD's, therefore the IC device 100 continuously or periodically scans area 620. The number of un-cooperating devices 802 and the number of cooperating devices 803 provides the WCD's count which can be controlled by the IC device 100. A complete detailed device listing 804 can list every device present on board and the corresponding inventory results. A local positioning system can be incorporated in any section of the plane 600 or in the sensors 601-603 capable of determining the seat location of detected WCD's. The detailed device listing 804 is arranged by the seat numbers 805 and lists all the corresponding WCD data such as, but not limited to device category 802, whether the device is cooperating 807, and whether the device can be switched to a local network 808.

More specifically, the IC device 100 detects four WCD's 611-614 wherein WCD 611 is a cellular telephone which functions cannot be controlled by the IC device 100 and is not capable of connecting to the local network. The owner of the cellular telephone will be asked to shut it down and not use it for the duration of the flight. WCD 612 is a laptop computer which can be controlled by the IC device 100 and is capable of synchronizing to the local network. Thus, the IC device 100 will shut down the transmitter during the restricted period. During the permitted local network access period, the IC device 100 will turn the transmitter back on and put the laptop computer on the local network. Laptop computer 613, which could be controlled by the IC device 100 but does not support the local network, will have its transmitter shut off during the whole duration of the flight. The owner of PDA 614 will be asked to turn her device off during the restricted period of the flight and will be given a notification of available local network access during the permitted period of the flight, since her device cannot be controlled by the IC device 100 but can synchronize with the local network.

Figure 10:
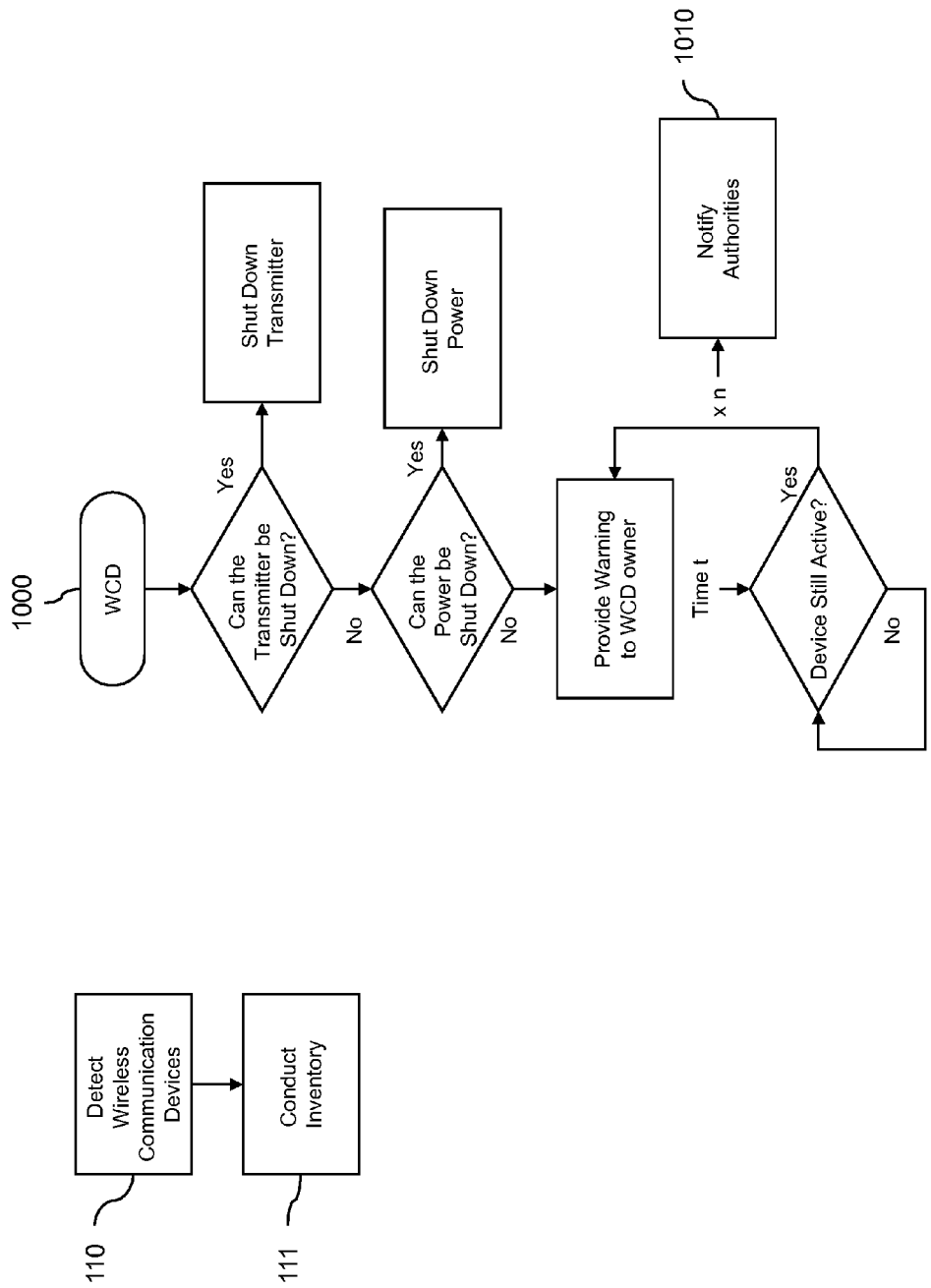
FIG. 10: Depicts a flow diagram of process steps an intelligent controller performs to restrict the usage of a communication device in a building or an even environment, in accordance with the present invention.

The IC device 100 can also be incorporated in a building or an event environment where WCD usage should be restricted. Such environment could be, but not limited to, a hospital, movie theater, restaurant, church, school, conference centers, casinos, government buildings, government events, and the like. Multiple sensors 901-902 are placed to cover the particular area 900 needed to be monitored. The IC device 100 is capable of communicating with sensors 901-902 and could be placed within the area 900 or at a remote location. The IC device 100 can command sensors 901-902 to detect WCD's 911-913 present in area 900, in process 110 of FIG. 10. An inventory is then conducted providing information about the detected WCD's 911-913 in process 111. The standard of use data can prevent the use of a WCD transmitting function at all times in hospital like environment or during particular time in the instance a movie is playing in a movie theater environment. The IC device 100 shuts down the transmitter or the WCD as shown in FIG. 10. If a WCD is not cooperating the IC device 100 can notify and provide owner's information to authorities in process 1010. The IC device 100 can gain such information from the WCD's service provider. A display screen can be connected to the IC device 100 to display inventory to area monitoring personnel.

Figure 11A:
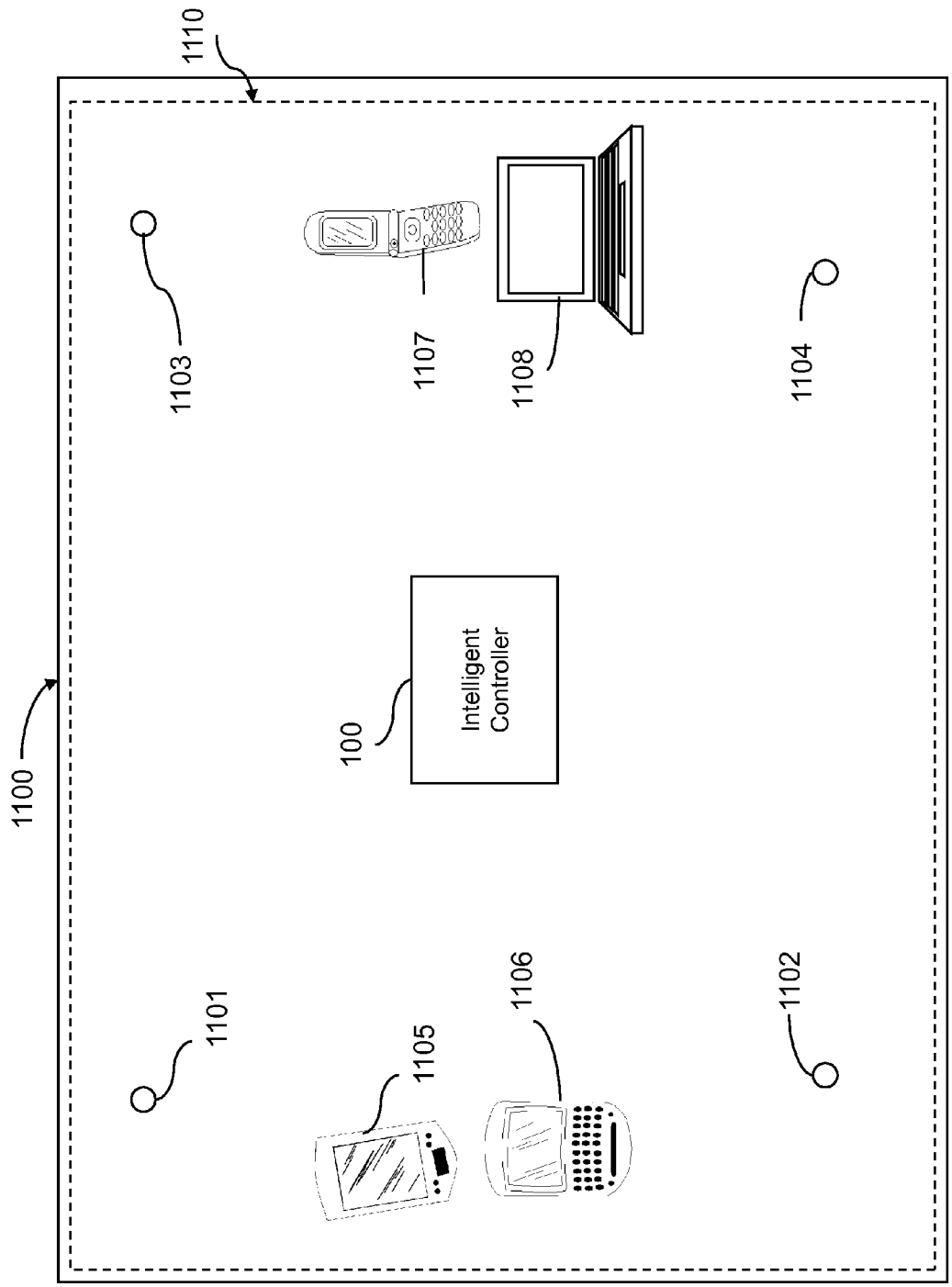
FIG. 11A: Depicts the integration of the intelligent controller in a financial institution, in accordance with the present invention.
Figure 11B:
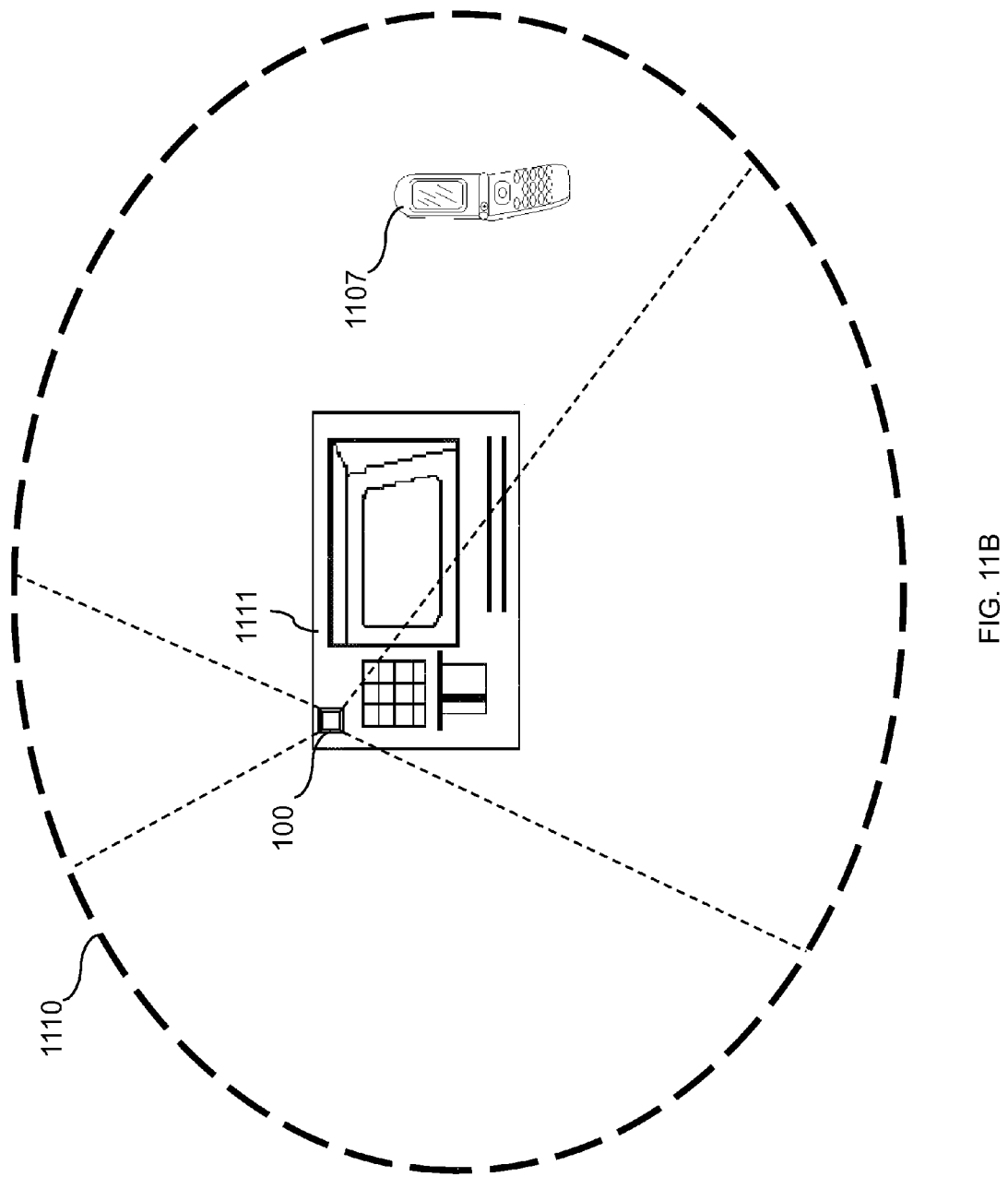
FIG. 11B: Depicts the integration of the intelligent controller in a peripheral area surrounding a monetary dispensing machine, in accordance with the present invention.
Figure 12:
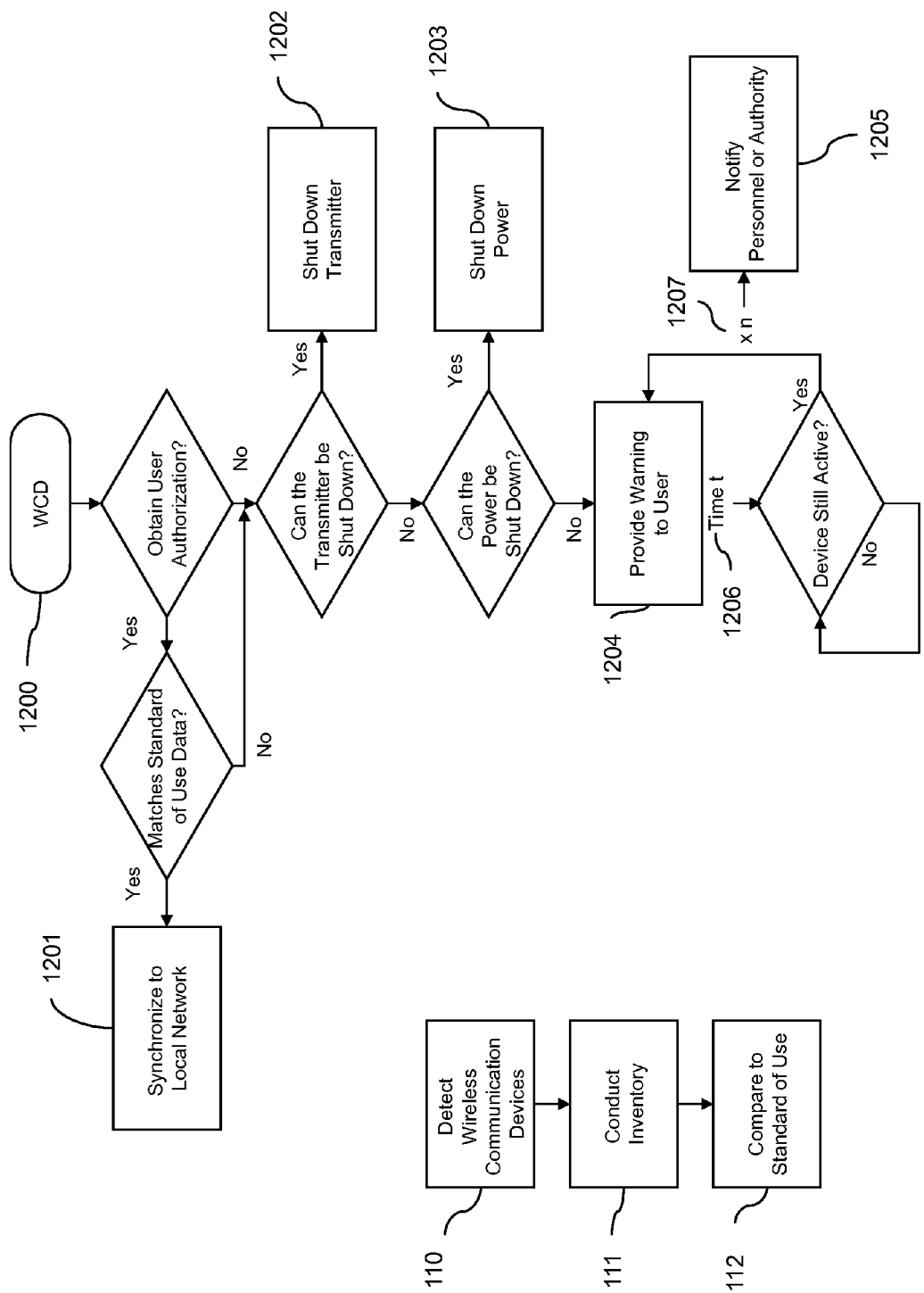
FIG. 12: Depicts a flow diagram of steps an intelligent controller performs to restrict the usage of a wireless communication device in a financial institution or a peripheral area surrounding a monetary dispensing machine, in accordance with the present invention.

A financial institution or a peripheral area surrounding a monetary dispensing machine may be such buildings or areas where WCD usage is restricted, as seen in FIGS. 11A and 11B. The IC device 100 may reside within financial institution 1100, a property belonging to the financial institution, monetary dispensing machine 1111 or any combination thereof. As many sensors 1101-1104 as needed are placed within area 1100 or monetary dispensing machine 1111 to cover the entirety of predetermined area 1110. The IC device 100, capable of communicating with and directing sensors 1101-1104, detects the WCD 1105-1108 in pre-determined area 1110 according to process 110 in FIG. 12. The IC device 100 can be controlled by a financial institution's personnel, monetary dispensing machine personnel, authorities, third party vendors or any combination thereof. The IC device 100 may be operational during an institution's work-day hours or continuously throughout all hours.

Following process 110, an inventory is conducted by recording and temporarily storing information about the detected WCD 1105-1108 as seen in process 111. Information may include authorization data received from a user of the WCD 1105-1108 or directly from the WCD 1105-1108. Authorization data may comprise biometric data from a user, an encrypted certificate, or any other means known or understood to be used in the art of secure wireless transmission. Biometric data may include retinal readings, vein patterns, finger prints, voice recognition, hand readings, temperature, or any other biometric data obtainable from a user. Biometric data can be collected directly from the WCD 1105-1108 or from a separate device residing at the financial institution 1100 or the monetary dispensing machine 1111. Authorization data from the WCD 1105-1108 may comprise encrypted certificates, returnable encryption schemes or any other means known or understood to be used in the art.

Standard of use data stored in the IC device 100 can prevent, allow, or limit WCD transmission. Standard of use data may include stored authorization data comprising biometric data, encrypted certificate, or any other means known or understood to be used in the art of secure wireless transmission. Standard of use data may also comprise WCD use restrictions based on the type of authorized users, such as financial institution guests, customers, employees, supervising employees, or the like. For example, financial institution guests may be completely restricted from using financial institution's network, while customers and employees may have limited restriction, and supervising employees may not have any imposed restrictions. In process 112, the obtained authorization data is compared to the standard of use data. If the standard of use data matches the obtained authorization data then the WCD 1105-1108 may synchronize to a local network 1201 yielding transmittal or receipt of data. Matching authorization data and standard of use data may also allow the user of the WCD 1105-1108 to continue normal use of the WCD 1105-1108 in pre-determined area 1110 without the IC device 100 commanding the WCD 1105-1108 to disable.

If the obtained authorization data does not match the standard of use data, the IC device 100 commands, through sensors 1101-1104, the WCD 1105-1108 to shut down transmission 1202 and/or shut down power 1203 in pre-determined area 1110. In the event the WCD 1105-1108 power cannot be shut down, IC device 100 provides a warning 1204 to the WCD 1105-1108. If the WCD 1105-1108 is still active after time t 1206, the IC device 100 sends x n 1207 more warnings. Following x n 1207 more warnings a financial institution's employees, personnel associated with the IC device 100, an authority, or any combination thereof are notified 1205 of the WCD 1105-1108 continued unauthorized activity.

Figure 13:
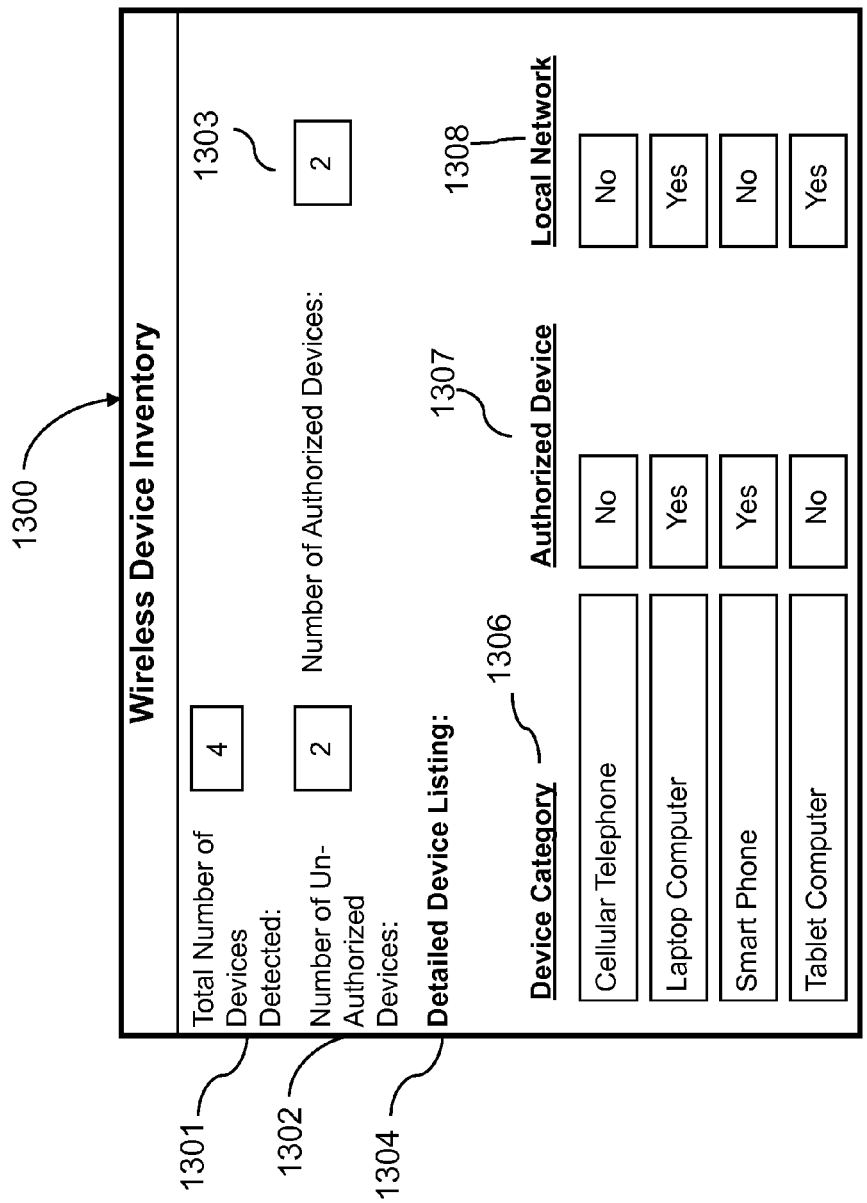
FIG. 13: Depicts a display screen used in association with financial institutions or monetary dispensing machines displaying information provided by the intelligent controller, in accordance with the present invention.

A display screen 1300 connected to the IC device 100 may be used by personnel or authorities in financial institutions or peripheral areas surrounding a monetary dispensing machine. Display screen 1300 provides WCD inventory information in pre-determined area 1110, as seen in FIG. 13. Inventory information may include total number of devices detected 1301, number of un-authorized devices 1302, number of authorized devices 1303, and detailed device listings 1304. The total number of devices detected 1301 may vary with time, as WCD's are turned on and off; therefore the IC device 100 continuously or periodically scans pre-determined area 1110.

A local positioning system may be incorporated into pre-determined area 1110 or sensors 1101-1104 to determine the location of the WCD 1105-1108 in the building or area. This information may be used to monitor the WCD 1105-1108 position. If WCD 1107 belonging to a financial institution's guest is being used in an area reserved for personnel, the IC device 100 may compare this information against standard of use data and subsequently shut down transmission or power of WCD 1107.

The information provided on the display screen 1300 may be used to cross-compare the number of currently authorized devices and supposed authorized devices. For example, if only financial institution employees are authorized in pre-determined area 1110, then there should never be more authorized WCD in pre-determined area 1110 than there are personnel in pre-determined area 1110. Discrepancies in this information may lead supervising personnel or authorities to be notified.

The invention claimed is:

1. A method for communication device management within an area associated with a financial institution comprising:
   detecting a plurality of communication devices, wherein said plurality of communication devices are transmitting at a plurality of signal strengths;
   detecting at least one communication device of said plurality of communication devices in said area associated with said financial institution, wherein said at least one communication device is associated with a user, and wherein said at least one communication device is adapted to communicate with a wireless network;
   recognizing at least a type or an identity of said at least one communication device;
   storing information regarding said at least one communication device, wherein said information is stored if a signal strength detected from said at least one communication device is above a predetermined level;
   controlling at least one function of said at least one communication device with an intelligent controller comprising a standard of use data;
   determining if said at least one communication device is authorized to transmit data from said area associated with said financial institution, wherein said intelligent controller authorizes said at least one communication device upon entering said area associated with said financial institution;
   notifying said at least one communication device if said at least one communication devices is not authorized to transmit said data;
   detecting continued transmission from said at least one communication device in response to said notification;
   transmitting information about said user to an authority if said intelligent controller is unable to shut down at least one function of said at least one communication device, wherein said at least one function prevents transmission of data from said at least one communication device, and wherein said authority is not associated with a service provider.

2. The method according to claim 1 wherein said at least one communication device is selected from a group consisting of a cellular telephone, a personal computer, a tablet computer, a pocket computer, and a hybrid device.

3. The method according to claim 1 further comprising the step of disabling at least one of a transmitter, a power supply, a processor, or a memory associated with said at least one communication device.

4. The method according to claim 1 further comprises the step of disrupting incoming signals or transmitting signals associated with said at least one communication device.

5. The method according to claim 1 wherein said standard of use data is stored in said intelligent controller.

6. The method according to claim 1 wherein said intelligent controller communicates with an outside source.

7. The method according to claim 6 wherein said outside source is selected from a group consisting of a cellular tower, a radio transmitters, Wi-Fi, Bluetooth, toll tag readers, and any combination thereof.

8. The method according to claim 6 wherein said standard of use data is communicated to said intelligent controller from said outside source.

9. The method according to claim 6 wherein said intelligent controller further comprises a positioning unit capable of determining the location of user in said area associated with said financial institution.

10. The method according to claim 9 wherein said intelligent controller communicates said location to said authority using said outside source.

11. The method according to claim 1 wherein authorization of said at least one communication device comprises biometric data from user, encrypted certificate from said at least one communication device or any other means known or understood to be used in the art.

12. The method according to claim 1 wherein said intelligent controller provides a warning to said user of said at least one communication device when said controlling means is unable to authorize said at least one function of said at least one communication device.

13. The method according to claim 11 wherein said warning comprises at least one selected from a group consisting of an audio signal, an alarm, and a visual signal.

14. The method according to claim 1 wherein said service provider issues a citation to said user of said at least one communication device after a predetermined number of said warnings, wherein said citation is issued if said predetermined number of said warnings is ignored by said user of said at least one communication device.

15. The method according to claim 1 wherein said service provider issues a citation to said user after a predetermined number of said warnings.

16. The method according to claim 1 wherein said standard of use data only restricts the use of said plurality of communication devices within a predetermined area of said area associated with said financial institution.

* * * * *